(12) United States Patent
Wei

(10) Patent No.: US 8,594,578 B2
(45) Date of Patent: Nov. 26, 2013

(54) METHOD AND SYSTEM FOR TRIGGERING OVERLOAD INDICATOR REPORT

(75) Inventor: Wei Wei, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 132 days.

(21) Appl. No.: 13/202,383

(22) PCT Filed: Sep. 23, 2009

(86) PCT No.: PCT/CN2009/074147
§ 371 (c)(1),
(2), (4) Date: Aug. 19, 2011

(87) PCT Pub. No.: WO2010/102486
PCT Pub. Date: Sep. 16, 2010

(65) Prior Publication Data
US 2011/0312268 A1    Dec. 22, 2011

(30) Foreign Application Priority Data

Mar. 10, 2009  (CN) .......................... 2009 1 0079420

(51) Int. Cl.
*H04B 15/00* (2006.01)
*H04B 7/00* (2006.01)

(52) U.S. Cl.
USPC .............. 455/63.1; 455/63.2; 455/68; 455/69

(58) Field of Classification Search
USPC .................................... 455/63.1, 63.2, 68, 69
See application file for complete search history.

(56) References Cited

U.S. PATENT DOCUMENTS

| 2002/0098860 | A1* | 7/2002 | Pecen et al. ............ 455/522 |
| 2005/0118993 | A1* | 6/2005 | Roux et al. ............ 455/423 |
| 2009/0179755 | A1* | 7/2009 | Bachl et al. ............ 340/540 |

(Continued)

FOREIGN PATENT DOCUMENTS

| CN | 101132223 A | 2/2008 |
| CN | 101272549 A | 9/2008 |
| CN | 101299891 A | 11/2008 |
| WO | 2008084694 A1 | 7/2008 |

OTHER PUBLICATIONS

Article 3GPP TSG RaAN WG2 #62bis Meeting, Warsaw, Poland, Jun. 30-Jul. 4, 2008 (R2 -083338), Title: Measurement Reporting for inter-cell Interference Coordinatiion (ICIC), Source—Alcatel-Lucent, Agenda item 5.5, pp. 1-7.

(Continued)

*Primary Examiner* — Wen Huang
(74) *Attorney, Agent, or Firm* — Banner & Witcoff, Ltd.

(57) ABSTRACT

The present invention discloses a method and system for triggering OI report. The method includes: a first terminal performing area division for its own coverage area to obtain layers of the coverage area of the first terminal; the first terminal determining a layer, in which a second terminal is located, of the coverage area of the first terminal according to maximum inter-cell interference intensity suffered by the second terminal currently; the first terminal computing PRBs needing to be computed according to status information of the interference suffered by the PRBs occupied by the second terminal, and setting a triggering threshold of the OI report used by the second terminal in the layer; and the first terminal triggering the OI report used by the second terminal when determining that the result of computing the PRBs is larger than the triggering threshold of the IO report.

12 Claims, 4 Drawing Sheets

(56) References Cited

U.S. PATENT DOCUMENTS

| | | | |
|---|---|---|---|
| 2009/0275342 A1* | 11/2009 | Iwamura et al. | 455/452.2 |
| 2010/0157934 A1* | 6/2010 | Tanno et al. | 370/330 |
| 2012/0082060 A1* | 4/2012 | Wei | 370/253 |

OTHER PUBLICATIONS

Written Opinion and ISR dated Dec. 31, 2009 for PCT/CN2009/074147, English translation.
International Search Report for PCT/CN2009/074147 dated Nov. 5, 2009.

* cited by examiner

METHOD AND SYSTEM FOR TRIGGERING OVERLOAD INDICATOR REPORT

TECHNICAL FIELD

The present invention relates to an inter-cell interference technology in the field of wireless communication, and more particularly, to a method and system for triggering overload indicator (OI) report when solving the problem of inter-cell interference.

BACKGROUND OF THE INVENTION

In the next generation wideband wireless communication networks, solving the problem of inter-cell interference becomes a key factor to improve user terminal (UT) throughput and the average UT throughput, and how to effectively solve the inter-cell interference faces big challenges.

Nowadays, in the Institute of Electrical and Electronics Engineers (IEEE) 802.16j, IMT-Advanced system and WINNER, methods of interference randomization, interference coordination and interference elimination are proposed to be used to solve the problem of inter-cell interference. The Long Term Evolution (LTE) system proposes, based on the above methods, dividing the coverage area of a current cell into an inner layer and outer layer according to the maximum interference level of a UT to all the adjacent cells, and employing partial power control and path loss compensation to solve the problem of inter-cell interference, wherein, the inner layer is the area with weaker inter-cell interference, and full power compensation is used to solve the problem of inter-cell interference; the outer layer is the area with stronger inter-cell interference, and partial power control and path loss compensation are applied to solve the problem of inter-cell interference.

In the LTE system, OI report is used to indicate the status of suffering interference of a physical resource block (PRB) occupied by a UT who suffers high level inter-cell interference; and load negotiation between different base stations (BS) is performed according to the OI report, so that the inter-cell interference suffered by the UT on the PRB is effectively decreased, so as to reach the purpose of coordinating the inter-cell interference.

The relative stipulation to OI report by the LTE system is as follows:

An OI value is set on each PRB, and the OI value is represented by two bits to indicate three statuses: high (00), medium (01) and low (10), which respectively represent that the statuses of the inter-cell interference suffered by the PRB is high, medium and low. Events to trigger the OI report include: over high or unacceptable Interference over Thermal (IoT), unsatisfactory uplink performance and load change in the cell.

When using the above trigger events to trigger the OI report, the OI report will be frequently triggered, thereby the load of the OI is increased, system overhead becomes very large and system operation efficiency is decreased.

SUMMARY OF THE INVENTION

In view of the above, a main object of the present invention is to provide a method, terminal and system for triggering an OI report to solve the problem that the OI report is frequently triggered in the prior art.

In order to achieve the above object, the technical scheme of the present invention is designed as follows.

The present invention provides a method for triggering an overload indicator report, comprising:

a first terminal performing area division for its own coverage area according to a preset area division threshold to obtain layers of the coverage area of the first terminal;

the first terminal determining a layer, in which a second terminal is located, of the coverage area of the first terminal according to maximum inter-cell interference intensity suffered by the second terminal currently; and the first terminal computing physical resource blocks needing to be computed according to status information of the interference suffered by the physical resource blocks occupied by the second terminal, and setting a triggering threshold of the overload indicator report used by the second terminal in the layer in which the second terminal is located; and the first terminal triggering the overload indicator report used by the second terminal when determining that a result of the computing is larger than the triggering threshold of the overload indicator report.

Wherein, the second terminal can be a relay station or a user terminal when the first terminal is a base station; and the second terminal can be a user terminal when the first terminal is a relay station.

The area division threshold can be set according to the following approach:

determining an adjacent cell generating maximum inter-cell interference intensity to the coverage area of the first terminal, and determining the interference intensity from an interference signal of said adjacent cell at each area in the coverage area of the first terminal, and then setting a first area division threshold and a second area division threshold according to the interference intensity.

The step of the first terminal performing area division for its own coverage area according to the preset area division threshold may comprise:

dividing the area suffering the interference intensity larger than the first area division threshold in the coverage area of the first terminal as a first layer;

dividing the area suffering the interference intensity between the first area division threshold and the second area division threshold in the coverage area of the first terminal as a second layer; and dividing the area suffering the interference intensity lower than the second area division threshold in the coverage area of the first terminal as a third layer.

The step of determining the layer, in which the second terminal is located, of the coverage area of the first terminal may comprise:

when the maximum inter-cell interference intensity suffered by the second terminal currently is larger than the first area division threshold, determining that the second terminal is located in the first layer;

when the maximum inter-cell interference intensity suffered by the second terminal currently is between the first area division threshold and the second area division threshold, determining that the second terminal is located in the second layer; and when the maximum inter-cell interference intensity suffered by the second terminal currently is lower than the second area division threshold, determining that the second terminal is located in the third layer.

The step of the first terminal computing the physical resource blocks needing to be computed according to the status information of the interference suffered by the physical resource blocks occupied by the second terminal may comprise:

the first terminal determining level(s) of the statuses of the interference suffered by the physical resource blocks needing to be computed according to the status information of the interference suffered by the physical resource blocks occupied by the second terminal, and computing the physical resource blocks needing to be computed according to the level(s) of the statuses of the interference suffered by the physical resource blocks needing to be computed.

The step of computing the physical resource blocks needing to be computed may comprise:

the first terminal calculating the percentage of the number of physical resource blocks needing to be computed to the total number of physical resource blocks occupied by the second terminal according to the level(s) of the statuses of the interference suffered by the physical resource blocks needing to be computed.

The step of setting the triggering threshold of the overload indicator report used by the second terminal in the layer in which the second terminal is located may comprise:

the first terminal setting the triggering threshold of the overload indicator report used by the second terminal in the layer in which the second terminal is located according to the level(s) of the statuses of the interference suffered by the physical resource blocks needing to be computed and the layer in which the second terminal is located, and according to a requirement.

The present invention further provides a terminal supporting triggering an overload indicator report, which is configured to perform area division for its own coverage area to obtain layers of its own coverage area, and determine the layer, in which another terminal is located, of its own coverage area; and to compute physical resource blocks occupied by the another terminal, set a triggering threshold of the overload indicator report used by the another terminal in the layer in which the another terminal is located, compare a result of the computing with the triggering threshold of the overload indicator report, and trigger the overload indicator report used by the another terminal when the result of the computing is larger than the triggering threshold of the overload indicator report.

The present invention further provides a terminal supporting triggering an overload indicator report, which is configured to report maximum inter-cell interference intensity suffered by the terminal currently and status information of the interference suffered by physical resource blocks occupied by the terminal to the above-described terminal supporting triggering an overload indicator report.

The present invention further provides a system for triggering an overload indicator report, comprising a first terminal and a second terminal, wherein:

the first terminal is configured to perform area division for its own coverage area to obtain layers of its own coverage, and determine a layer, in which the second terminal is located, of the coverage area of the first terminal; and to compute physical resource blocks occupied by the second terminal, set a triggering threshold of the overload indicator report used by the second terminal in the layer in which the second terminal is located, compare a result of the computing with the triggering threshold of the overload indicator report, and trigger the overload indicator report used by the second terminal when the result of the computing is larger than the triggering threshold of the overload indicator report; and the second terminal is configured to report maximum inter-cell interference intensity suffered by itself currently and status information of the interference suffered by the physical resource blocks occupied by the second terminal to the first terminal The method for triggering an OI report in accordance with the present invention effectively reduces the times of triggering and sending the OI report, decreases the OI load, and thus reduces the system overhead by dividing the coverage area of the BS or RS in a wireless communication network, and adding restrictions on triggering the OI report based on this new network structure, such as determining the layer in which the RS or the UT is located, determining the triggering threshold of the OI report used by the RS or the UT in the current layer, determining the level(s) of the statuses of the interference suffered by the PRBs needing to be computed, and comparing the triggering threshold of the OI report in the current layer with the result of computing the PRBs, etc.

PREFERRED EMBODIMENTS OF THE PRESENT INVENTION

The technical scheme of the present invention will be described in detail below in combination with the drawings and embodiments.

The method for triggering the OI report in accordance with the present invention is applicable to both an ordinary wireless communication network and a wireless communication network equipped with relay stations (RS). The method for triggering the OI report in accordance with the present invention can be divided into two parts: one is using a BS as a first terminal to determine the triggering of the OI report used by a second terminal, wherein the second terminal can be a RS or UT; the other is using the first terminal to determine the triggering of the OI report used by the second terminal (UT), wherein the first terminal can be a BS or RS.

Figure 1:
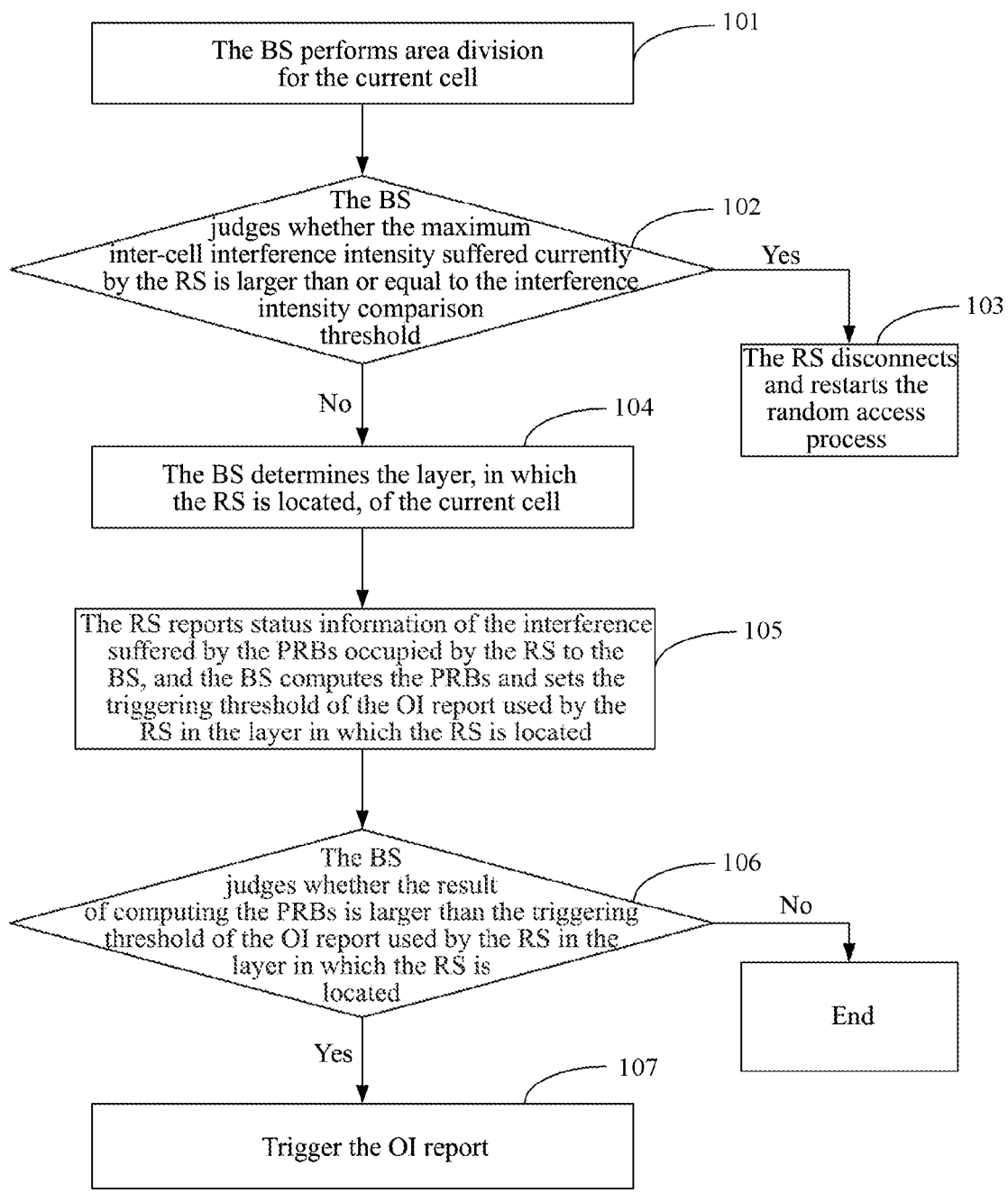
FIG. 1 is an illustration of a flow chart of a method for triggering an OI report in accordance with a first embodiment of the present invention.

In the following, specific examples are used to illustrate the method for triggering the OI report in accordance with the present invention when the first terminal is a BS and the second terminal is a RS. As shown in FIG. 1, the method includes the following steps:

Step 101, the BS performs area division for the current cell.

In the present invention, area division of the cell is performed according to an area division threshold preset in the BS. Preferably, the following method can be adopted to set the area division threshold: the BS determines interference intensity from each of adjacent cells on the current cell, finds out the adjacent cell having the maximum interference intensity, and determines interference intensity at each area of the current cell caused by the interference signal from the adjacent cell having the maximum interference intensity, and determines the area division threshold according to the interference intensity at each area of the current cell. Besides, other methods can be applied to set the area division threshold, for example, determining the area division threshold according to a path loss measurement result.

Figure 2:
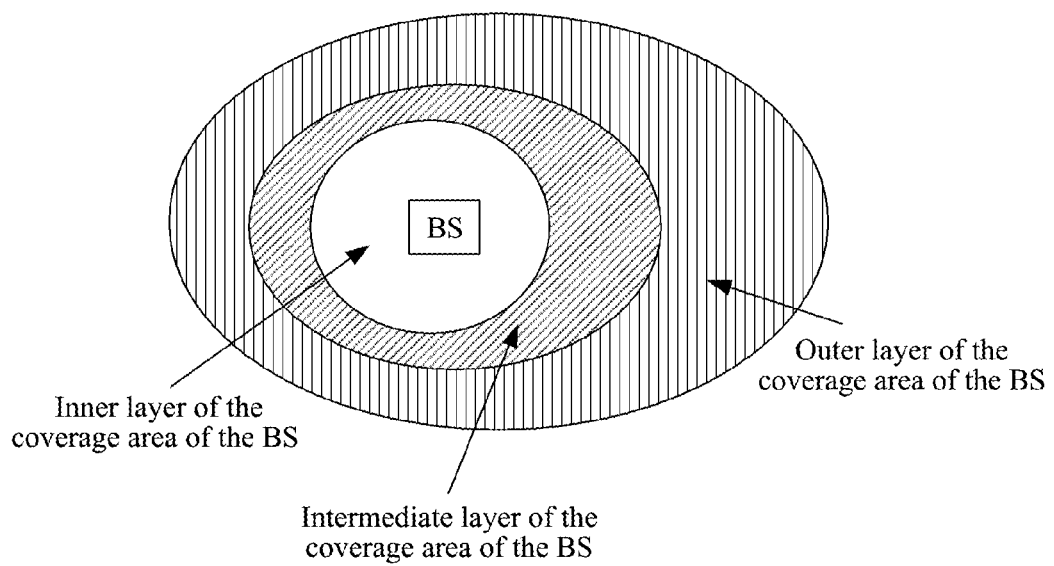
FIG. 2 is an illustration of a layered structure of a wireless communication network in accordance with the first embodiment of the present invention.

Preferably, two area division thresholds can be set: a first area division threshold and a second area division threshold. According to these two preset thresholds, the current cell is divided into three layers: a first layer, a second layer and a third layer, where the first layer may be an outer layer, the second layer may be an intermediate layer and the third layer may be an inner layer, as shown in FIG. 2. The first area division threshold is an intermediate layer to outer layer threshold, and the second area division threshold is an inner layer to intermediate layer threshold.

For example, according to the demand, the area with an interference intensity from the adjacent cell having the maximum interference intensity being larger than 25% in the current cell can be set as the outer layer, the area with an interference intensity of 10% to 25% as the intermediate layer, and the area with an interference intensity of less than 10% as the inner layer. Then the area division threshold includes an inner layer to intermediate layer threshold being 10% and an intermediate layer to outer layer threshold being 25%.

From the above area division of the cell, it can be seen that:

The inner layer suffers the minimum interference intensity. In practical applications, the inter-cell interference intensity in the inner layer is considered as very low or even zero, thus the influence of the inter-cell interference to the inner layer can be neglected.

The outer layer suffers the maximum interference intensity. In practical applications, the probability that this area suffers the inter-cell interference is big and the inter-cell interference suffered is strong, therefore, the inter-cell interference suffered by this area needs to be reduced.

The interference intensity in the intermediate layer is between those in the inner layer and the outer layer. In practical applications, the inter-cell interference in this area is considered as acceptable.

Steps 102~103, the BS judges whether the maximum inter-cell interference intensity suffered currently by the RS is larger than or equal to the interference intensity comparison threshold; if yes, the BS instructs the RS to disconnect and restart the random access process, otherwise, proceed to step 104.

The RS measures the inter-cell interference intensity it suffers currently, and reports the maximum inter-cell interference intensity suffered to the BS. That the RS measures the inter-cell interference it suffers currently is the prior art, and will not be repeated here.

The BS compares the maximum inter-cell interference intensity suffered currently by the RS with the interference intensity comparison threshold. If the maximum inter-cell interference intensity suffered currently by the RS is larger than or equal to the interference intensity comparison threshold, it means that the RS currently suffers so high an inter-cell interference intensity that the communication between the RS and the BS is severely affected. If the current BS is continuously used as the serving BS for this RS, an ideal effect can not be achieved even with the processing of inter-cell interference coordination. At this time, the current BS instructs the RS to disconnect, and the RS will re-initiate the random access process, that is, the RS will reselect a suitable serving BS. If the maximum inter-cell interference intensity suffered currently by the RS is smaller than the interference intensity comparison threshold, proceed to step 104.

The interference intensity comparison threshold is an empirical value determined by the operator or the device manufacturer according to factors such as the network planning, the size of the cell coverage area and the BS transmission power, etc.

Step 104, the BS determines the layer, in which the RS is located, of the current cell.

The BS compares the maximum inter-cell interference intensity suffered currently by the RS with the area division threshold. If the maximum inter-cell interference intensity suffered currently by the RS is larger than the intermediate layer to outer layer threshold, the RS is located in the outer layer; if the maximum inter-cell interference intensity suffered currently by the RS is between the inner layer to intermediate layer threshold and the intermediate layer to outer layer threshold, the RS is located in the intermediate layer; and if the maximum inter-cell interference intensity suffered currently by the RS is lower than the inner layer to intermediate layer threshold, the RS is located in the inner layer.

Step 105, the RS reports status information of the interference suffered by PRBs occupied by the RS to the BS, and the BS computes the PRBs and sets the triggering threshold of the OI report used by the RS in the layer in which the RS is located.

The PRBs are time-frequency resource, and each PRB has an OI value which indicates the status of the inter-cell interference suffered by this PRB. The status of the inter-cell interference suffered by the PRB is determined according to the inter-cell interference intensity suffered by the PRB. The number of PRBs occupied by the RS is determined by the system according to the amount of current communication of the RS.

The OI values of the PRBs occupied by the RS, as well as the statuses of the inter-cell interference suffered by the PRBs which are indicated by the OI values, are preset by the BS as desired.

Preferably, the OI values can be divided into three levels and represented by 2 bits. The three levels of the OI values are represented as 00, 01 and 10 respectively.

Corresponding to the levels of the OI values, the statuses of the inter-cell interference suffered by the PRBs can be divided into three levels: high interference, medium interference and low interference. Preferably, when the interference intensity suffered by a PRB is larger than the intermediate layer to outer layer threshold, the level of the status of the interference suffered by this PRB is set as high interference; when the interference intensity suffered by a PRB is between the inner layer to intermediate layer threshold and the intermediate layer to outer layer threshold, the level of the status of the interference suffered by this PRB is set as medium interference; and when the interference intensity suffered by a PRB is lower than the inner layer to intermediate layer threshold, the level of the status of the interference suffered by this PRB is set as low interference. Then the correspondence relationship between the OI values and the statuses of the interference suffered by the PRBs can be: 00 corresponds to the high interference (H), 01 corresponds to the medium interference (M), and 10 corresponds to the low interference (L).

Suppose that the statuses of the interference suffered by the PRBs occupied by the RS are shown as Table 1:

TABLE 1

| PRB index | 1 | 2 | 3 | 4 | 5 | 6 | 7 | 8 | 10 | 11 | 12 |
|---|---|---|---|---|---|---|---|---|---|---|---|
| The status of the interference suffered by the PRB | H | H | M | L | M | H | L | L | H | H | M |

According to the statuses of the interference suffered by the PRBs occupied currently by the RS, the BS sets the triggering threshold of the OI report used by the RS in the layer in which the RS is located. For different RSs in different layers, the BS can configure the triggering threshold of the OI report as desired in practical applications.

Preferably, for the current RS, the BS can firstly determine the level(s) of the statuses of the interference suffered by the PRBs needing to be computed, that is, select a method for computing the levels of the statuses of the interference; and then the BS sets the triggering threshold of the OI report used by the RS in the layer in which the RS is currently located according to the method for computing the levels of the statuses of the interference and the layer in which the RS is currently located.

When choosing the method for computing the levels of the statuses of the interference, it may be chosen to compute the PRBs in the same level of status of interference, or to compute the PRBs in a plurality of levels of statuses of interference. For example, when the number of PRBs in the "H" level of the status of interference is relatively large, preferably, it may be chosen to only compute the PRBs in the "H" level of the status of interference, which is beneficial to reflecting the current situation of the interference suffered by the RS; when the number of PRBs in the "H" level of the status of interference is relatively small while the number of PRBs in the "M" level of the status of interference is relatively large, it may be chosen to compute simultaneously the PRBs in the "H" and "M" levels of the statuses of the interference, which is beneficial to discovering the potential interference suffered by the RS.

According to the method for computing the levels of the statuses of the interference, the BS can compute the PRBs and calculates the percentage of the number of PRBs needing to be computed to the total number of PRBs. Taking the statuses of the interference suffered by the PRBs shown in Table 1 as an example, the number of PRBs in the "H" level of the status of interference is relatively large, and preferably, it may be chosen to only compute those PRBs in the "H" level of the status of interference. Then the percentage of the computed PCBs to the total PRBs is (5/12)×100%=42%, which means that 42% of the time-frequency resource in all the PRBs occupied by the RS suffers high inter-cell interference intensity.

According to the above method for computing the levels of the statuses of the interference suffered by the PRBs, the specific triggering threshold of the OI report set may be different when the method for computing the levels of the statuses of the interference chosen is different.

In addition, assume that the RS is in the inner layer, if it is not hoped that the OI report of the inner layer is triggered frequently, then the triggering threshold of the OI report can be set as close to, equal to or larger than the inner layer to intermediate layer threshold; if the RS is in the outer layer, and it is not hoped that the OI report of the outer layer is frequently triggered, then the triggering threshold of the OI report can be set as close to, equal to or larger than the maximum inter-cell interference intensity suffered by the RS.

Steps 106~107, the BS judges whether the result of computing the PRBs is larger than the triggering threshold of the OI report used by the RS in the layer in which the RS is located; if yes, proceed to step 107 and trigger the OI report, otherwise end the process.

If the result of computing the PRBs is larger than the triggering threshold of the OI report used by the RS in the layer in which the RS is located, the BS triggers the OI report used by the RS in the layer in which the RS is located.

Suppose that the result of computing the PRBs is: the percentage of the number of the computed PRBs to the total number of PRBs being (5/12)×100%=42%, and if the layer in which the RS is currently located is the outer layer and the triggering threshold of the OI report used by the RS in the outer layer is 30%, then the OI report used by the RS in the outer layer can be trigged; otherwise the process is ended.

It should be noted that the second terminal in this process may else be a UT, therefore, the RS in this process has the characteristics of a UT.

Figure 3:
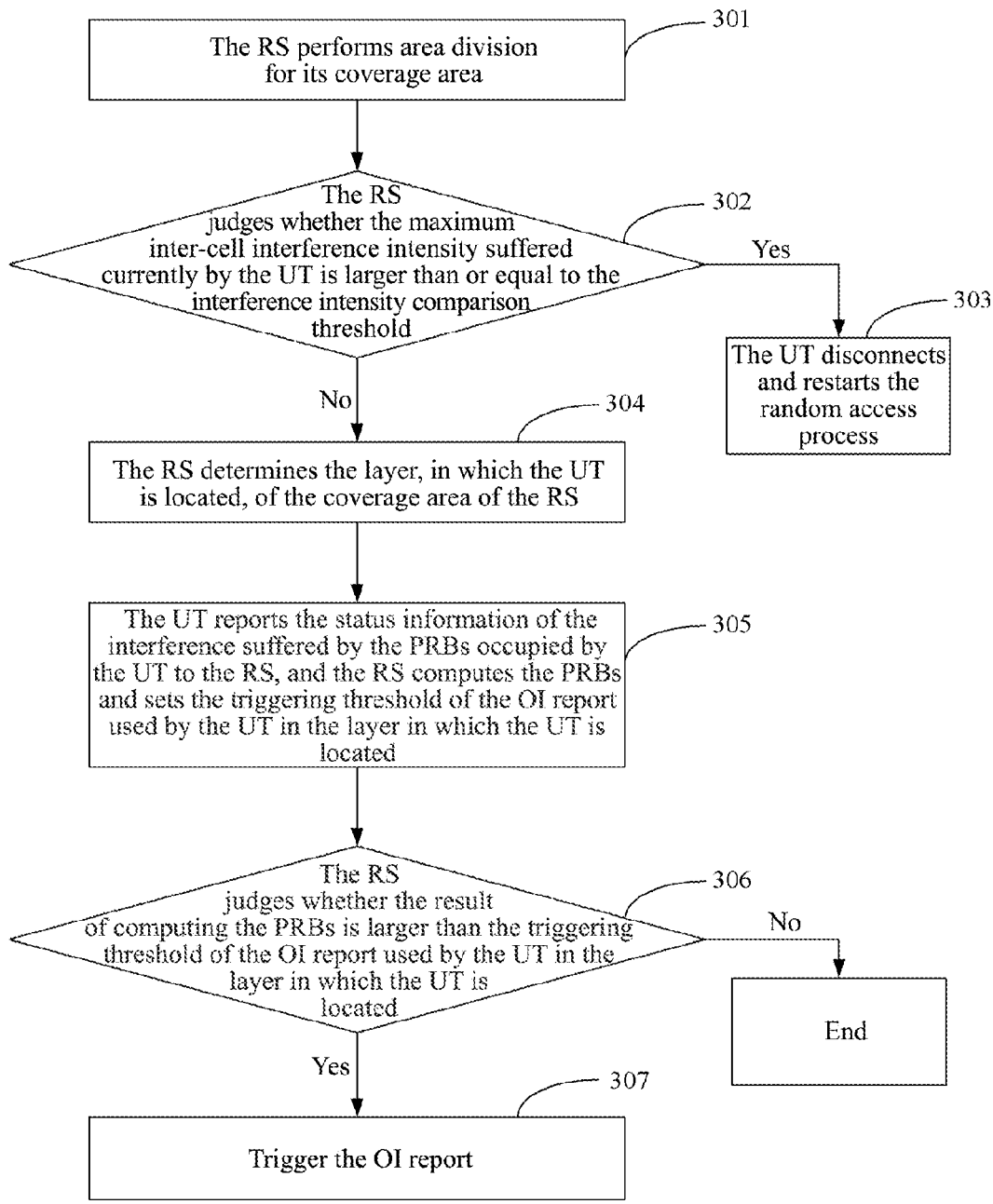
FIG. 3 is an illustration of a flow chart of a method for triggering an OI report in accordance with a second embodiment of the present invention.

When the first terminal is a RS and the second terminal is a UT, the method for triggering the OI report in accordance with the present invention is shown in FIG. 3, which includes the following steps:

Step 301, the RS performs area division for its coverage area.

When performing area division for the coverage area of the RS, the BS presets an area division threshold for the RS and delivers it to the RS, and then the RS performs area division for its coverage area according to the area division threshold. Preferably, the method for setting the area division threshold of the RS can be the same as the method used in step 101. It should be noted that, the coverage area of the RS may be within a cell or cross a plurality of cells, and one cell may include a plurality of RSs, therefore the areas adjacent to the coverage area of the current RS may include cells or the coverage areas of other RSs. The current RS needs to determine the area having the maximum interference intensity among the adjacent areas, and determine the maximum interference intensity to the RS generated by the interference signal from the area having the maximum interference intensity, and then report it to the BS. The BS sets the area division threshold of the RS according to this maximum interference intensity to the RS.

Preferably, the coverage area of the RS can also be divided into the inner layer, the intermediate layer and the outer layer.

Steps 302~303, the RS judges whether the maximum inter-cell interference intensity suffered by the UT is larger than or equal to the interference intensity comparison threshold; if yes, the RS instructs the UT to disconnect and restart the random access process; otherwise, proceed to step 304.

The UT measures the inter-cell interference intensity it suffers currently, and reports the maximum inter-cell interference intensity suffered to the RS, wherein it is the prior art that the UT measures the inter-cell interference intensity it suffers currently, and will not be repeated here.

The RS compares the maximum inter-cell interference intensity suffered by the UT currently with the interference intensity comparison threshold, and the judgment method in this step is the same as step 102 and will not be repeated here. The interference intensity comparison threshold is an empirical value determined by the operator or the device manufacturer according to factors such as the network planning, the size of the coverage area of the RS and the RS transmission power, etc.

Step 304, the RS determines the layer, in which the UT is located, of the coverage area of the RS.

The RS compares the maximum inter-cell interference intensity suffered currently by the UT and the area division threshold of the RS, and the specific judgment method is the same as step 104 and will not be repeated here.

Step 305, the UT reports the status information of the interference suffered by the PRBs occupied by the UT to the RS, and the RS computes the PRBs and sets the triggering threshold of the OI report used by the UT in the layer in which the UT is located.

The implementation method of this step is the same as step 105 and will not be repeated here.

It should be noted that the levels of the OI values of the PRBs occupied by the UT, as well as the statuses of the interference suffered by the PRBs which are indicated by the OI values, are set by the BS via the RS, and the specific method includes: the BS determines the levels of the OI values of the PRBs occupied by the RS and the statuses of the interference suffered by the PRBs which are indicated by the OI values, and authorizes and delivers the information to the RS via an uplink; and the RS sets the levels of the OI values of the PRBs occupied the UT and the statuses of the interference suffered by the PRBs which are indicated by the OI values according to the information delivered by the BS. According to the method in the above step 105, preferably, the RS can divide the OI values of the PRBs occupied by the UT into three levels which are represented by 2 bits. The three levels of the OI values can be respectively represented as 00, 01 and 10. The statuses of the interference suffered by the PRBs can be divided into high interference, medium interference and low interference. Thus, the correspondence relationship between the OI values and the statuses of the interference suffered by the PRBs can also be: 00 corresponds to the high interference (H), 01 corresponds to the medium interference (M), and 10 corresponds to the low interference (L).

Moreover, determining the level(s) of the statuses of the interference suffered by the PRBs needing to be computed for the UT is also controlled by the BS via the RS. The BS first determines the level(s) of the statuses of the interference suffered by the PRBs needing to be computed when triggering the OI report used by the RS, and authorizes and delivers them to the RS via an uplink; the RS takes these level(s) of the statuses of the interference suffered by the PRBs needing to be computed as the level(s) of the statuses of the interference suffered by the PRBs needing to be computed when triggering the OI report used by the UT; and according to the method in step 105, the level of the statuses of the interference suffered by the PRBs needing to be computed determined by the BS when triggering the OI report used by the RS is "H", then the RS computes the PRBs in the "H" level of the status of interference among the PRBs occupied by the UT when triggering the OI report used by the UT.

Steps 306~307, the RS judges whether the result of computing the PRBs is larger than the triggering threshold of the OI report used by the UT in the layer in which the UT is located; if yes, proceed to step 307 and trigger the OI report, otherwise end the process.

The RS triggers the OI reported used by the UT in the layer in which the UT is located if the result of computing the PRBs is larger than the triggering threshold of the OI report used by the UT in the layer in which the UT is located.

In this process, the RS determines the condition for triggering the OI report used by the UT according to the information delivered by the BS. It can be seen that the RS in this process has the characteristics of a BS.

In addition, the layered structure of the coverage area of the BS or RS in the wireless communication network in the present invention plays an important role in the applications after the OI report is triggered.

1. In the layered structure, the interference intensity in the intermediate layer is lower than that in the outer layer. When the UT is in the intermediate layer, the target transmission power can be achieved by properly adjusting the path loss compensation factor, thus reducing the interference to other UTs in the cell and to the adjacent cells caused by increasing transmission power, and meanwhile improving the flexibility of the path loss compensation of the UT, effectively increasing the throughput of the UT at the edge of the cell and the average UT throughput.

2. When assigning the time-frequency resource, i.e. the PRBs, to the inner layer, the intermediate layer and the outer layer, the PRBs in those layers are maintained orthogonal, and when the number of PRBs occupied by the inner layer or outer layer is too many due to overload or full load, the PRBs in the intermediate layer can be an effective supplement, and meanwhile the orthogonality of the time-frequency resource in the inner layer and the outer layer after the supplement can be guaranteed. The orthogonality of the time-frequency resource in the layers makes sure that the PRBs used by the BS for scheduling the UT in frequency domain will not be used by the UT in the adjacent cells; meanwhile, the uplink transmission power in different layers can be controlled to coordinate the inter-cell interference; and the throughput of the UT at the edge of the cell and the average UT throughput are increased without bandwidth loss.

Figure 4:
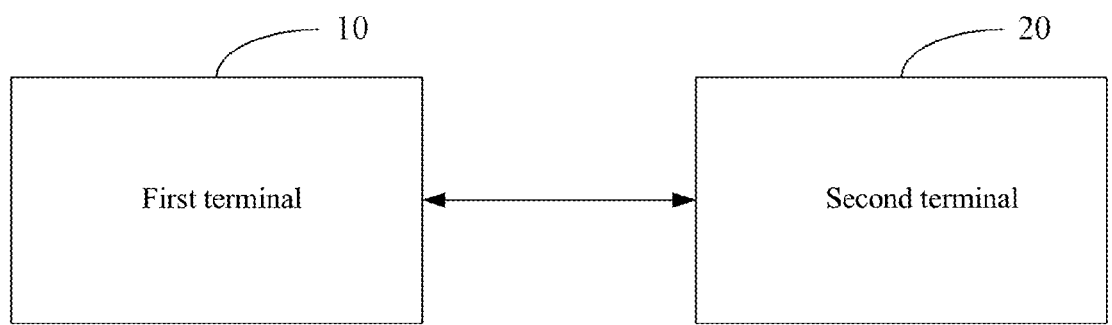
FIG. 4 is an illustration of a structural relationship of a system for triggering an OI report in accordance with the present invention.

In order to implement the method for triggering the OI report, the present invention also provides a system for triggering the OI report, as shown in FIG. 4. The system includes a first terminal 10 and a second terminal 20.

The first terminal 10 is used to perform area division for its own coverage area to obtain the layers of its own coverage area, and to determine the layer, in which the second terminal 20 is located, of the coverage area of the first terminal 10; and further used to compute the PRBs occupied by the second terminal 20 and set the triggering threshold of the OI report used by the second terminal 20 in the layer in which the second terminal 20 is located; and further used to compare the result of computing the PRBs with the triggering threshold of the OI report, and to trigger the OI report used by the second terminal 20 when the result of computing the PRBs is larger than the triggering threshold of the OI report.

The second terminal 20 is used to report the maximum inter-cell interference intensity suffered by the second terminal 20 currently and the status information of the interference suffered by the PRBs occupied by the second terminal 20 to the first terminal 10.

The above description is only preferred embodiments of the present invention and is not intended to limit the scope of the present invention.

INDUSTRIAL APPLICABILITY

The method for triggering the OI report in accordance with the present invention effectively reduces the times of triggering and sending the OI report, decreases the OI load, and thus reduces the system overhead by dividing the coverage area of the BS or RS in a wireless communication network, and adding restrictions on triggering the OI report based on this new network structure, such as determining the layer in which the RS or the UT is located, determining the triggering threshold of the OI report used by the RS or the UT in the current layer, determining the level(s) of the statuses of the interference suffered by the PRBs needing to be computed, and comparing the triggering threshold of the OI report in the current layer with the resulting of the computing the PRBs, etc.

I claim:
1. A method for triggering an overload indicator report, comprising:
a first terminal dividing coverage area of the first terminal into layers according to inter-cell interference intensity in the coverage area;

the first terminal determining a layer, in which a second terminal is located, of the coverage area of the first terminal according to maximum inter-cell interference intensity suffered by the second terminal currently; and the first terminal computing physical resource blocks needing to be computed according to status information of the interference suffered by the physical resource blocks occupied by the second terminal, and setting a triggering threshold of the overload indicator report used by the second terminal in the layer in which the second terminal is located according to the level(s) of the statuses of interference suffered by the physical resource blocks needing to be computed and the layer in which the second terminal is located, and according to a system requirement; and the first terminal triggering the overload indicator report used by the second terminal when determining that a result of the computing is larger than the triggering threshold of the overload indicator report.

2. The method of claim 1, wherein the second terminal is a relay station or a user terminal when the first terminal is a base station; and the second terminal is a user terminal when the first terminal is a relay station.

3. The method of claim 2, wherein the step of dividing coverage area of the first terminal into layers comprises:

determining an adjacent cell generating maximum inter-cell interference intensity to the coverage area of the first terminal, and determining the interference intensity from an interference signal of said adjacent cell at each area in the coverage area of the first terminal, and then setting a first area division threshold and a second area division threshold according to the interference intensity.

4. The method of claim 3, wherein the step of dividing coverage area of the first terminal into layers further comprises:

dividing the area suffering the interference intensity larger than the first area division threshold in the coverage area of the first terminal as a first layer;

dividing the area suffering the interference intensity between the first area division threshold and the second area division threshold in the coverage area of the first terminal as a second layer; and dividing the area suffering the interference intensity lower than the second area division threshold in the coverage area of the first terminal as a third layer.

5. The method of claim 4, wherein the step of determining the layer, in which the second terminal is located, of the coverage area of the first terminal comprises:

when the maximum inter-cell interference intensity suffered by the second terminal currently is larger than the first area division threshold, determining that the second terminal is located in the first layer;

when the maximum inter-cell interference intensity suffered by the second terminal currently is between the first area division threshold and the second area division threshold, determining that the second terminal is located in the second layer; and when the maximum inter-cell interference intensity suffered by the second terminal currently is lower than the second area division threshold, determining that the second terminal is located in the third layer.

6. The method of claim 1, wherein the step of dividing coverage area of the first terminal into layers comprises:

determining an adjacent cell generating maximum inter-cell interference intensity to the coverage area of the first terminal, and determining the interference intensity from an interference signal of said adjacent cell at each area in the coverage area of the first terminal, and then setting a first area division threshold and a second area division threshold according to the interference intensity.

7. The method of claim 6, wherein the step of dividing coverage area of the first terminal into layers further comprises:

dividing the area suffering the interference intensity larger than the first area division threshold in the coverage area of the first terminal as a first layer;

dividing the area suffering the interference intensity between the first area division threshold and the second area division threshold in the coverage area of the first terminal as a second layer; and dividing the area suffering the interference intensity lower than the second area division threshold in the coverage area of the first terminal as a third layer.

8. The method of claim 7, wherein the step of determining the layer, in which the second terminal is located, of the coverage area of the first terminal comprises:

when the maximum inter-cell interference intensity suffered by the second terminal currently is larger than the first area division threshold, determining that the second terminal is located in the first layer;

when the maximum inter-cell interference intensity suffered by the second terminal currently is between the first area division threshold and the second area division threshold, determining that the second terminal is located in the second layer; and when the maximum inter-cell interference intensity suffered by the second terminal currently is lower than the second area division threshold, determining that the second terminal is located in the third layer.

9. The method of claim 1, wherein the step of the first terminal computing the physical resource blocks needing to be computed according to the status information of the interference suffered by the physical resource blocks occupied by the second terminal comprises:

the first terminal determining level(s) of the statuses of the interference suffered by the physical resource blocks needing to be computed according to the status information of the interference suffered by the physical resource blocks occupied by the second terminal, and computing the physical resource blocks needing to be computed according to the level(s) of the statuses of the interference suffered by the physical resource blocks needing to be computed.

10. The method of claim 9, wherein the step of computing the physical resource blocks needing to be computed comprises:

the first terminal calculating the percentage of the number of physical resource blocks needing to be computed to the total number of physical resource blocks occupied by the second terminal according to the level(s) of the statuses of the interference suffered by the physical resource blocks needing to be computed.

11. A terminal supporting triggering an overload indicator report, configured to divide coverage area of the terminal into layers according to inter-cell interference intensity in the coverage area, and determine the layer, in which another terminal is located, of the coverage area; and to compute physical resource blocks occupied by the another terminal, set a triggering threshold of the overload indicator report used by the another terminal in the layer in which the another terminal is located according to the level(s) of the statuses of interference suffered by the physical resource blocks needing to be computed and the layer in which the second terminal is located, and according to a system requirement, compare a result of the computing with the triggering threshold of the overload indicator report, and trigger the overload indicator report used by the another terminal when the result of the computing is larger than the triggering threshold of the overload indicator report.

12. A terminal supporting triggering an overload indicator report, configured
   to report maximum inter-cell interference intensity suffered by the terminal currently and status information of the interference suffered by physical resource blocks occupied by the terminal to a terminal supporting triggering an overload indicator report as claimed in claim 11.

* * * * *

UNITED STATES PATENT AND TRADEMARK OFFICE
CERTIFICATE OF CORRECTION

PATENT NO. : 8,594,578 B2  Page 1 of 1
APPLICATION NO. : 13/202383
DATED : November 26, 2013
INVENTOR(S) : Wei Wei It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 130 days.

Signed and Sealed this
Twenty-second Day of September, 2015

Michelle K. Lee
*Director of the United States Patent and Trademark Office*